(12) United States Patent
De Lescure et al.

(10) Patent No.: US 12,380,055 B2
(45) Date of Patent: Aug. 5, 2025

(54) SYSTEM AND METHOD FOR PERFORMING TRANSACTION AGGREGATION IN A NETWORK-ON-CHIP (NoC)

(71) Applicant: ARTERIS, INC., Campbell, CA (US)

(72) Inventors: Benoit De Lescure, Campbell, CA (US); Michael Frank, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 582 days.

(21) Appl. No.: 17/338,151

(22) Filed: Jun. 3, 2021

(65) Prior Publication Data

US 2021/0382847 A1 Dec. 9, 2021

Related U.S. Application Data

(60) Provisional application No. 63/036,944, filed on Jun. 9, 2020.

(51) Int. Cl.
*G06F 15/78* (2006.01)
*H04L 45/24* (2022.01)
*H04L 49/103* (2022.01)
*H04L 49/109* (2022.01)

(52) U.S. Cl.
CPC ........ *G06F 15/7825* (2013.01); *H04L 45/245* (2013.01); *H04L 49/103* (2013.01); *H04L 49/109* (2013.01)

(58) Field of Classification Search
CPC . G06F 15/7825; H04L 45/245; H04L 49/103; H04L 49/109
See application file for complete search history.

(56) References Cited

U.S. PATENT DOCUMENTS

| 4,920,484 A | 4/1990 | Ranade | |
|---|---|---|---|
| 2006/0285548 A1* | 12/2006 | Hill | H04Q 3/68 370/418 |
| 2007/0153782 A1* | 7/2007 | Fletcher | H04L 43/00 370/466 |
| 2013/0083794 A1* | 4/2013 | Lakshmanamurthy | G06F 13/364 370/428 |
| 2013/0179902 A1* | 7/2013 | Hoover | G06F 15/7825 719/313 |

(Continued)

FOREIGN PATENT DOCUMENTS

EP 0379709 B1 8/1995

*Primary Examiner* — Walter J Divito
(74) *Attorney, Agent, or Firm* — Jubin Dana; Dana Legal Services

(57) ABSTRACT

System and methods are disclosed for aggregating identical requests sent to a target from multiple initiators through a network-on-chip (NoC). The requests are marked for aggregation. The NoC uses request aggregators (RA) as an aggregation point to aggregate the identical requests that are marked for aggregation. At the aggregation point, the identical requests are reduced to a single request. The single request is sent to the target. The process is repeated in a cascaded fashion through the NoC, possibly involving multiple request aggregators. When a response transaction is received back from the target, which is at the aggregation point closest to the target, the response transaction is duplicated and sent to every original requester, either directly or through other request aggregators, which further duplicate the already duplicated response transaction.

9 Claims, 7 Drawing Sheets

(56) References Cited

U.S. PATENT DOCUMENTS

2017/0220499 A1\* 8/2017 Gray ................. G06F 13/36
2019/0334759 A1\* 10/2019 Ray ................. H04L 41/064

\* cited by examiner

SYSTEM AND METHOD FOR PERFORMING TRANSACTION AGGREGATION IN A NETWORK-ON-CHIP (NoC)

CROSS REFERENCE TO RELATED APPLICATION

This application claims the benefit of U.S. Provisional Application Ser. No. 63/036,944 that was filed on Jun. 9, 2020 by Benoit DE LESCURE et al. and titled SYSTEM AND METHOD FOR PERFORMING TRANSACTION AGGREGATION IN A NETWORK-ON-CHIP (NoC), the entire disclosure of which is incorporated herein by reference.

FIELD OF THE INVENTION

The present technology is in the field of computer system design and, more specifically, related to aggregating transactions inside of a network-on-chip (NoC) to improve performances.

BACKGROUND

Multiprocessor systems implemented in systems-on-chips (SoCs) communicate through networks, such as a network-on-chip (NoC). Intellectual Property (IP) blocks are used in chip design. The SoCs include instances of intellectual property (IP) blocks. Some IP blocks are initiators. Some IP blocks are targets. Initiators and targets communicate through a network, such as a NoC.

Transactions are sent from an initiator to a target using any of the many industry-standard protocols, such as ARM AMBA AXI, AHB or APB; or OCP-IP. Such protocols have a strict request/response semantic, and typically are treated by the NoC as unicast: the initiator, which is connected to the NoC, sends a request to a target. The initiator uses an address to select the target. The initiator sends a request transaction to a target, using an address to select the target. The NoC decodes the address and transports the request from the initiator to the target. The target handles the request transaction and sends a response transaction, which is transported back, by the NoC, to the initiator.

If multiple initiators need to send the same request to the same address (to one target), this set of requests (all identical, all to the same address) will be serialized by the interconnect, such as the NoC, at the target. The target sends the same response to every initiator, one at a time. This is very inefficient because the target sends the same response to multiple initiators in a serialized fashion and that same response occupying possibly the same interconnect links multiple times. For example, if 16 initiators want to read data at the same address of the same target, the interconnect (NoC) will have to serialize the 16 identical requests to the target. Then the target needs to send back, 16 times, the same data to each requesting initiator. The time taken by the total operation at the target is 16 times the time of a single read request. Therefore, what is needed is a system and method that aggregates identical requests sent to a target to reduce the number of identical requests being sent to the target, reduce the number of identical request transported by the NoC, and conversely reduce the number of identical responses transported by the NoC.

SUMMARY OF THE INVENTION

In accordance with various embodiments and aspects of the invention, a system and method are disclosed that aggregate identical requests sent to a target from multiple initiators. Identical requests are marked for aggregation. The interconnect or network-on-chip (NoC) aggregates all of the identical requests at an aggregation point. At the aggregation point, the multiple identical requests are reduced to a single request. The single request is sent to the target. In accordance with the various aspects of the invention, the process is repeated in a cascaded fashion through the NoC. When a response—to the request—is received back from the target at the aggregation point, the response is duplicated and sent to every original initiator.

One advantage of the various aspects and embodiments of the invention is enabling maximum efficiency of the operation that includes sending the same request to the same address from multiple initiators. Another advantage includes, but is not limited to, systems where the request is a read request. The various aspects and embodiments of the invention cover other type of requests, such as write requests. To take the non-limiting example above, the 16 initiators each send a read (or a write) to the same address of a target. The target will only receive one read (or write) command. Then the target will only send one response (if the request was a read; no response is needed if the request was a write or the response is a confirmation that the write was performed) that will be duplicated on its way back, which is 16 times.

Yet another advantage of the various aspects and embodiments of the invention is in applications wherein multiple initiators or nodes want to read the same data from external memory simultaneously, such as deep neural network computations and artificial intelligence computations.

BRIEF DESCRIPTION OF THE DRAWINGS

In order to more fully understand the invention, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1A:
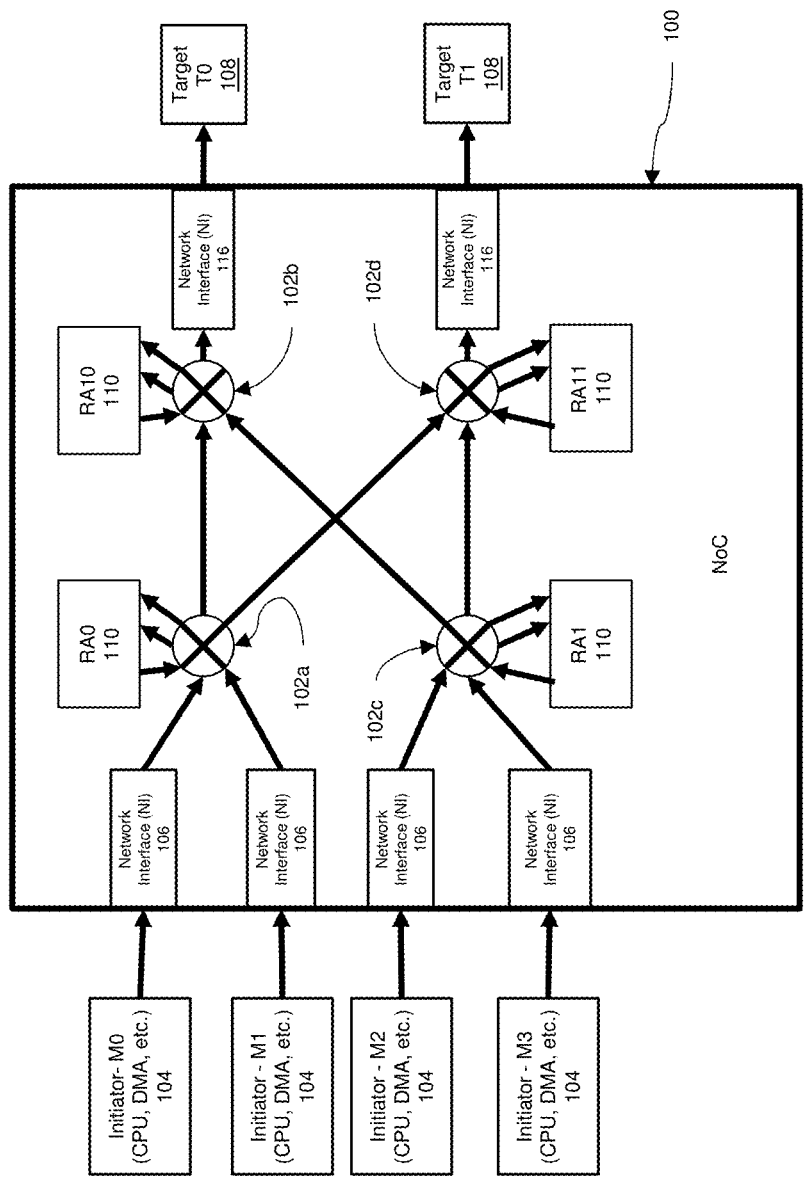
FIG. 1A shows a Network-on-Chip (NoC) connecting multiple initiators to multiple targets in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

As used herein, an "initiator" refers to intellectual property (IP) blocks, units, or modules. The terms "initiator," "requestor," and "master" are used interchangeably within the scope and embodiments of the invention. As used herein, a "target" and a "slave" refer to IP blocks; the terms "target" and "slave" are used interchangeably within the scope and embodiments of the invention.

As used herein, a transaction may be a request transaction or a response transaction. Examples of request transactions include write requests and read requests. When multiple initiators send identical requests to the same target, in accordance with the various aspects of the invention, the requests are aggregated. In accordance with one aspect of the invention an "identical request" means that the request transaction has the same address, is of the same type, and has the same size; the identical request is sent from multiple initiators to one target. In accordance with one aspect of the invention an "identical request" means that the request transaction has the same address, optionally the same request type, and optionally the same length.

As used herein, a node is defined as a distribution point or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Referring now to FIG. 1, a Network-on-Chip (NoC) 100 is shown in accordance with the various aspects and embodiments of the invention. The NoC 100 includes nodes or switches 102a, 102b, 102c, and 102d. Initiators 104 (M0, M1, M2, M3) are connected to the NoC 100 using network interface (NI) units 106. The NI units 106 translate the incoming transactions (requests, which are read or write) to the protocol used by the NoC 100. The NoC 100 is connected to targets 108 (T0, T1) using network interface (NI) units 116, which perform a similar function to the NI units 106, translating NoC protocol to the target protocol.

Figure 1B:
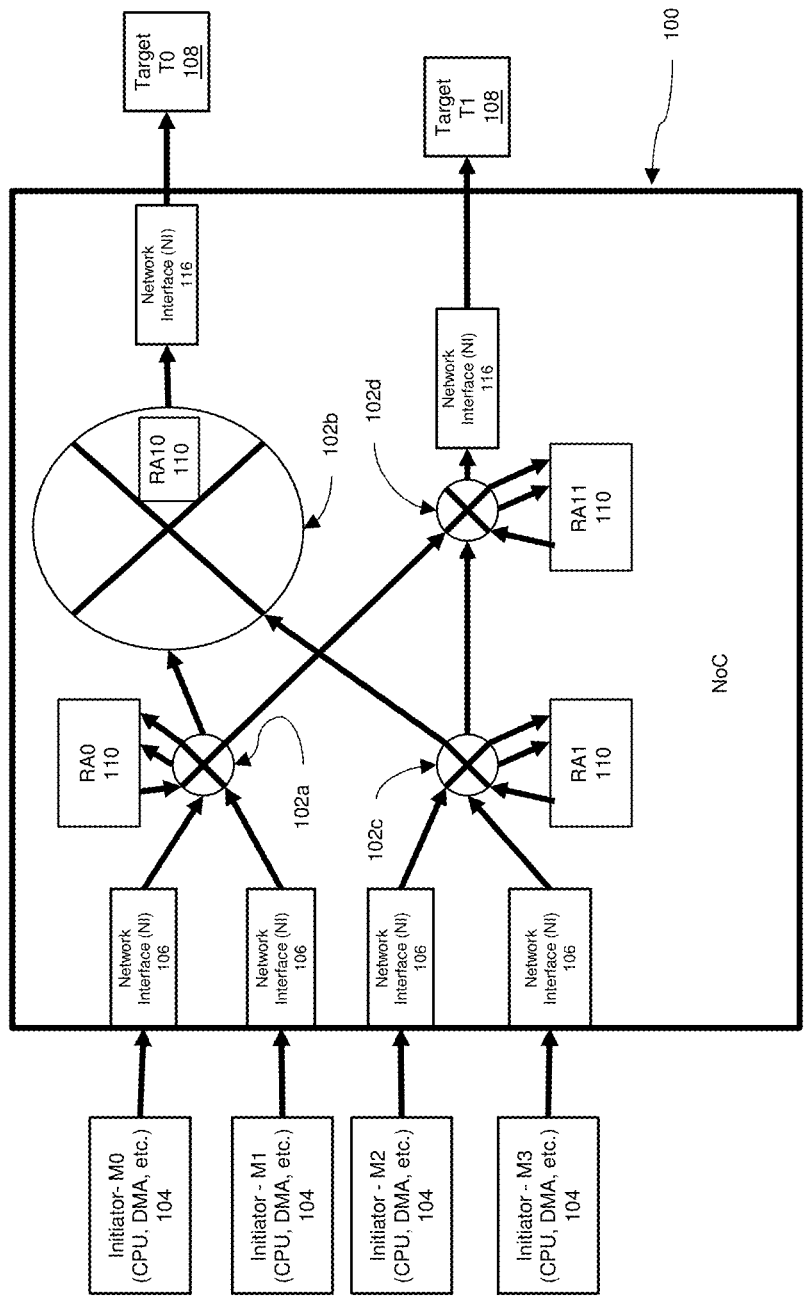
FIG. 1B shows a NoC connecting multiple initiators to multiple targets in accordance with the various aspects and embodiments of the invention.
Figure 1C:
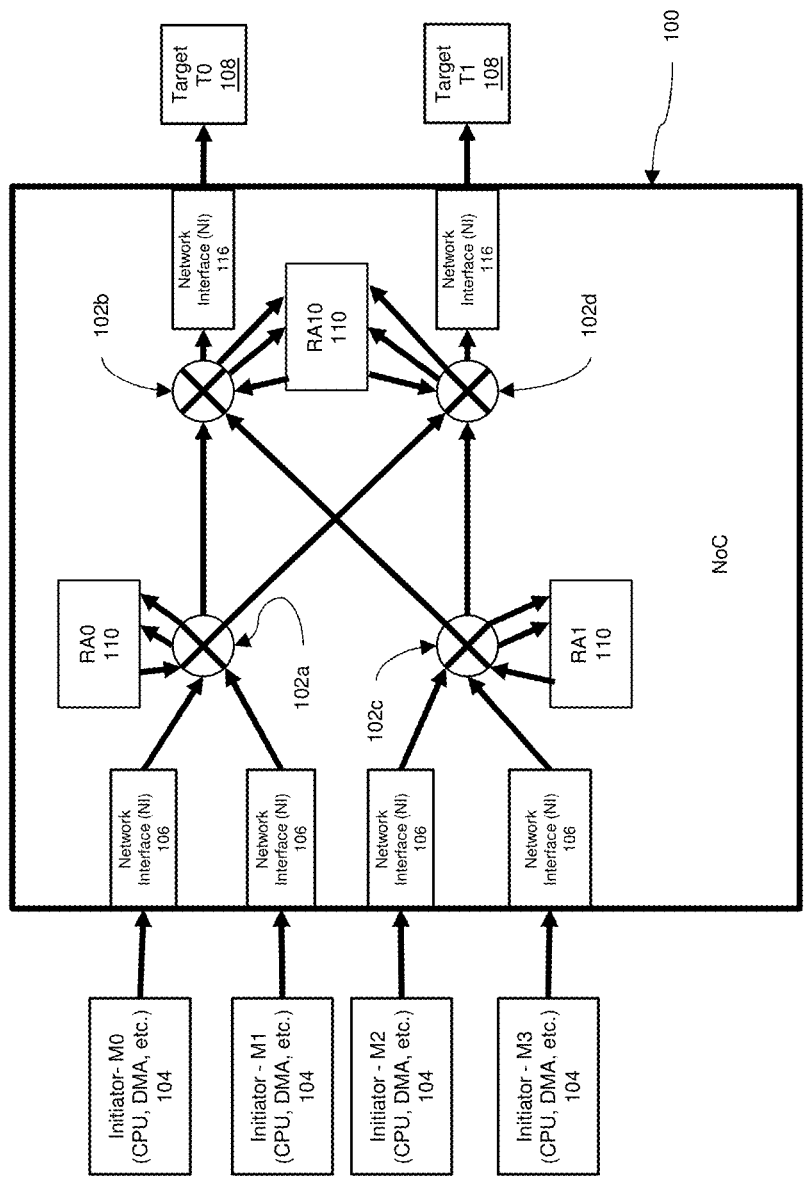
FIG. 1C shows a NoC connecting multiple initiators to multiple targets in accordance with the various aspects and embodiments of the invention.

In accordance with various aspects of the invention, only the request network connection is illustrated in FIG. 1A, FIG. 1B, and FIG. 1C for clarity. A request transaction travels from any one of the initiators 104 through the NoC 100 and to any one of the targets 108. In accordance with other aspects of the invention, there is a corresponding response network that also exists wherein responses travel from targets to initiators.

In accordance with some aspects and embodiments of the invention, the NoC 100 includes request aggregators (RA) 110, such as RA0, RA1, RA10, and RA11. Various embodiments for implementation of the RA 110 are possible. In accordance with some aspects and embodiments of the invention, the RA 110 is a hardware component that works in conjunction with and is connected to a switch 102, as shown in FIG. 1 for clarity.

Referring to FIG. 1B, any RA 110 (such as a RA10 110 as shown) may be a hardware component that is part of or internal to the switch 102, such as switch 102b, in accordance with other aspects and embodiments of the invention.

Referring now to FIG. 1C, any RA 110 (such as RA10 110 as shown) can support and service multiple switches 102 (such as 102b and 102d) in accordance with some other aspects and embodiments of the invention.

The RAs 110 are connected to the request networks and response networks. As noted, for clarity only, the request network side for a connection is shown in FIG. 1A, FIG. 1B, and FIG. 1C. The response network connection is not shown, even though it is similar to FIGS. 1A, FIG. 1B, and FIGS. 1C and 1n the opposite direction. The RA 110 includes multiple ingress port. Each ingress port is a destination for requests (intended for a specific target) and source for responses (intended for a specific initiator). The RA 110 has at least one egress ports, which is a source of requests and destination of responses. RA 110 receive request packets on a set of ingress port, aggregates the requests and send the aggregate request to one egress port. In accordance with one aspect of the invention, the number of ingress and egress ports is set at design time.

Figure 2:
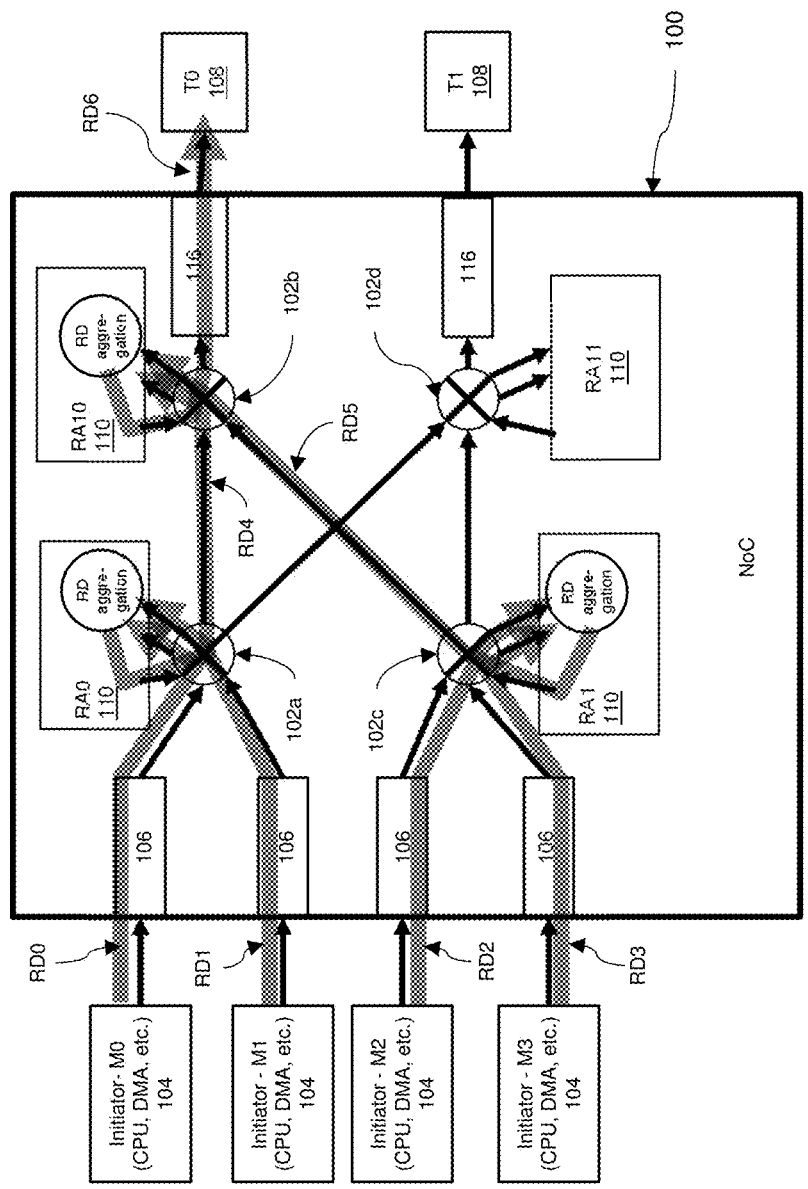
FIG. 2 shows the NoC of FIG. 1 with aggregation of request transactions that are sent from multiple initiators to one target in accordance with the various aspects and embodiments of the invention.
Figure 3:
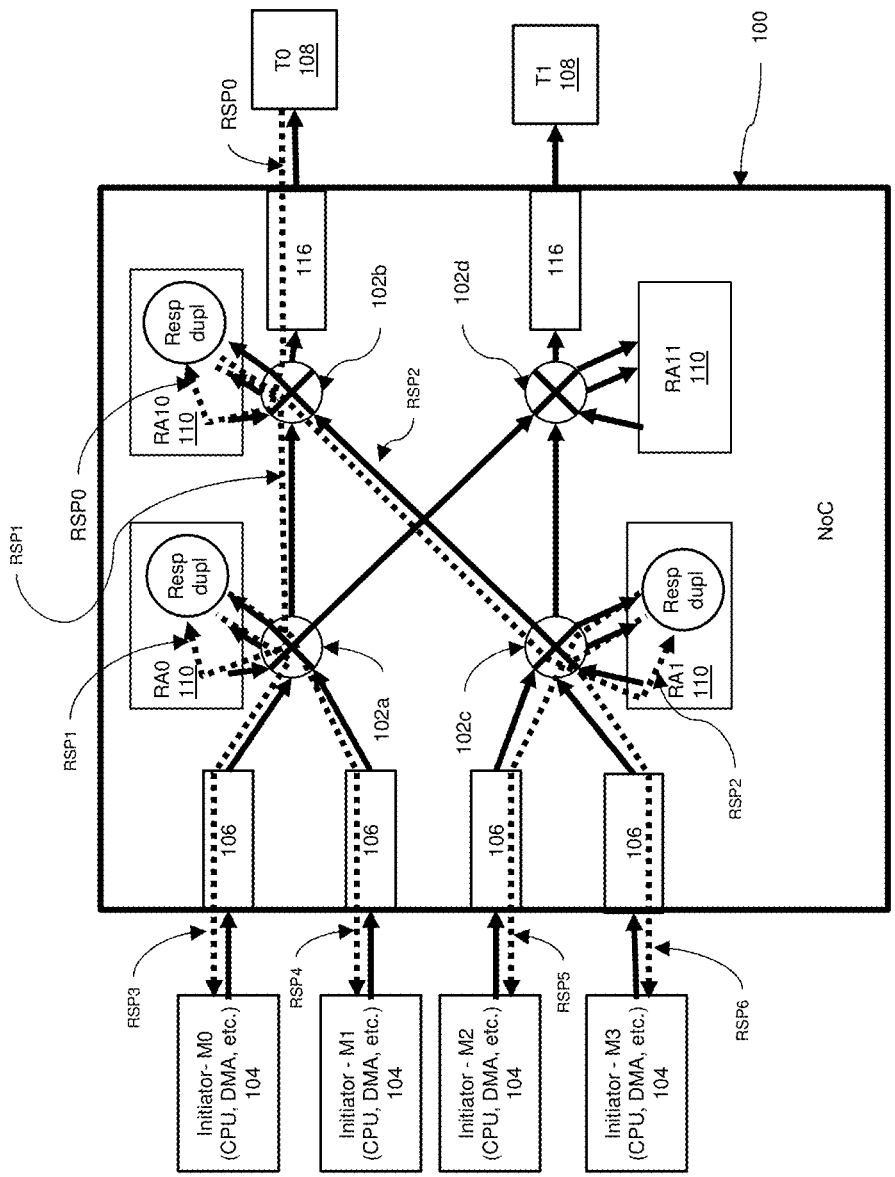
FIG. 3 shows the NoC of FIG. 2 with a response transaction sent from one target to multiple initiators in accordance with the various aspects of the invention.

Referring now to FIG. 2, RAs 110 (RA0, RA1, RA10 and RA11) are show in accordance with some aspects and embodiments of the invention. In one example, multiple identical requests, such as read (RD) requests (RD0, RD1, RD2, and RD3) are generated from multiple initiators 104 (M0, M1, M2, and M3), respectively. The requests RD0, RD1, RD2, and RD3 are transactions that are intended for or sent to T0. The read request transactions RD0, RD1, RD2 and RD3 are identical requests and have been identified for aggregation using a special marker, a special address, a qualifier bit, or a combination of bits, which is included in the transaction payload. Such requests can be aggregated when they are sent to a special address region as shown in an address map 400 of FIG. 4.

RD0 and RD1 arrive at switch 102a and then go to RA0 110. RD0 and RD1 are aggregated at RA0 to generate an aggregated read request transaction RD4. RD4, which is one single occurrence of the original request transactions RD0 and RD1, is sent to switch 102b and then to RA10 110, which is progressing towards the target T0.

RD2 and RD3 arrive at switch 102c and then to RA1 110. RD2 and RD3 are aggregated at RA1 110 to generate an aggregated read request transaction RD5. RD5, which is one single occurrence of the original request transactions RD2 and RD3, is sent to switch 102b and then RA10 110, which is progressing towards the target T0.

At RA10 110, the two aggregated requests RD4 and RD5, which are from RA0 110 and RA1 110 respectively, are again aggregated to generate an aggregated read request transaction RD6. RD6 is sent to the NI unit 116 and then to the target TO.

Figure 5:
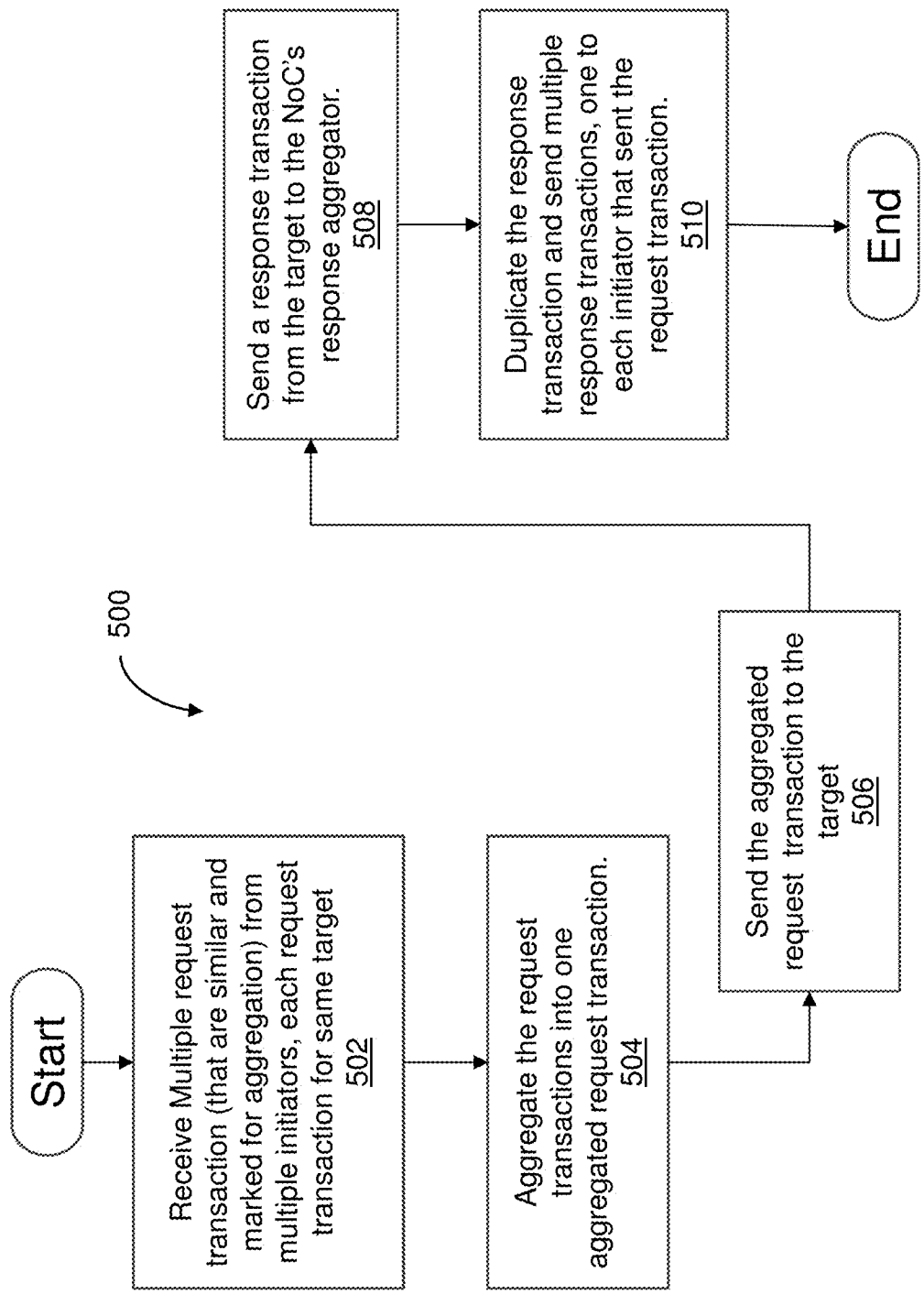
FIG. 5 show a process for aggregating transactions in accordance with the various aspects and embodiments of the invention.

Referring now to FIG. 5, a response transaction RSP0 is generated by the target T0 108. The appropriate RA is an identified destination for response transactions. RSP0 is sent back from target T0 108 and at one point arrives at a switch of the response network that is connected to RA10 110, and then goes to the response port of the egress port of RA10 110. As noted above for the request transaction side and in accordance with the various aspects and embodiments of the invention, then RA can be part of a switch's hardware.

RA10 110 duplicates the response transaction to generate RSP1 and RSP2. RA10 110 sends RSP1 and RSP2 back towards the response port of the egress port of RA0 110 and RA1 110, respectively. RA10 110 sends the response transactions to the RAs, from which it received a request transaction. Thus, RA10 110 sends one response transaction to RA0 110 and one response transaction to RA1 110 because the original request transactions come to RA10 110 from RA0 110 and RA1 110.

RSP1 is received at the response port of the egress port of RA0 110. RA0 110 duplicates RSP1 to generated RSP3 and RSP4 and sends these to Initiator M0 104 and Initiator M1 104, respectively, which initiators sent the original requests RD0 and RD1.

RSP2 is received at the response port of the egress port of RA1 110. RA1 110 duplicates RSP2 to generated RSP5 and RSP6. RA1 110 then sends RSP5 and RSP6 to Initiator M2 104 and Initiator M3 104, respectively, which sent the original request transactions RD2 and RD3.

The various aspects and embodiments of the invention are most advantageous but not limited to, the case where the request is a read request. The invention can also cover other type of requests, such as write requests. In some embodiments, write requests have a response that is generated after the transaction is completed. In some embodiments, when write requests are performed, no response is generated after the transaction is completed.

The various aspects and embodiments of the invention are applicable to any kind of network topology, and are most useful, but not limited to, situations where it is possible to cascade RAs to limit, to a minimum, the traffic of requests and responses. In accordance with various embodiments of the invention, multiple aggregator cascades can exist in a NoC, and one aggregator can be part of multiple different cascades, such as illustrated FIG. 1, with two cascades ending at T0 and T1.

In accordance with various aspects and embodiments of the invention, an RA aggregates two or more identical requests by using storage that exists in each RA. The storage is used to track the addresses and size of requests that have been aggregated. When a new request comes through one of the aggregator ingress ports, the storage is looked up to see if an identical request (same address with optionally same request type and/or optionally same length) has been recorded already. If yes, then the RA remembers from which ingress port and from which source (initiator) the request arrived or came; nothing is sent to the egress port of the RA: that request is "aggregated" with the already received ones. If the storage lookup does not indicate that an identical request has been recorded, then the RA remembers from which ingress port and from which source the request arrived or came and a new entry is added in its storage. Additionally, the request is recorded in the storage, including address and optionally the type and/or optionally the length. After a number of requests are aggregated, the RA sends one corresponding request on its egress port. In accordance with some aspects and embodiments of the invention, the number of request that need to be aggregated before a request is emitted on the RA's egress port is configured at design time. In accordance with some aspects and embodiments of the invention, the number of requests that need to be aggregated is specified dynamically in a special field of the packets' headers. An entry is removed from the storage used to track the addresses of requests that have been aggregated when all responses to the corresponding request have been send back to the requester after duplication.

Figure 4:
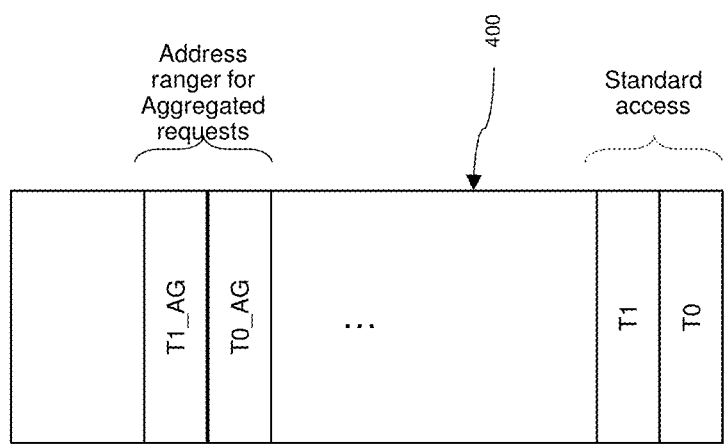
FIG. 4 shows an address map in accordance with the various aspects and embodiments of the present invention.

In accordance with various aspects and embodiments of the invention, the initiator chooses between a normal transaction going to one target and the aggregation operation by tagging the operations to aggregate using a request qualifier. One example of such a request qualifier is using a special marker or address bit, as shown in FIG. 4. When a request transaction is sent to a target with this special address bit equal to 0, no aggregation is done by the NoC. If the request transaction is sent when this special address bit is 1, then the request transaction goes through the RAs. The request transaction is aggregated with other requests using the same special address bit set to 1 and going to the same address.

In accordance with various aspects of the invention, RAs do request aggregation by combining all the requests, which correspond to accessing the same location in a target of or connected to the NoC, into a single request using a combination function.

As noted, one advantage of the various aspects and embodiments of the invention is for read aggregation, where all read requests are combined into one, identical to all the original requests. Other advantage can be achieved wherein the request transaction is a write request. The invention is not limited by the type of transaction. For instance, write requests aggregation, where the write data associated with each request are combined together according to some mathematical function or logic operation function.

In accordance with one variation of the aspects and embodiment of the invention, in some or all RAs, additional response storage is implemented. This additional storage can be used to hold the response being duplicated for some time, allowing each response port to make progress independently from the others. It will also allow servicing requests for an address, arriving after a set of requests for the same address have been already aggregated, and responded to already. This requires not removing the corresponding entry in the address store when all responses have been sent back, but instead keeping entries longer, and removing them based on age or other eviction mechanism.

In accordance with various aspects and embodiments of invention, the system and method include implementing, in some or all RAs, speculative issue of aggregated read requests that are larger (ask for more data) than the original read requests. Then if subsequent requests come to the aggregator and ask for data, which is part of the data that has been speculatively requested, the transaction waits in the aggregator for the response to the speculative request to come back. When the response comes back, all requests are responded in the aggregator, including the ones which were waiting for the speculatively requested data. In other words, RAs can support speculative prefetch of read data.

Referring now to FIG. 5, a process 500 is shown for aggregating request transactions in accordance with the various embodiments and aspects of the invention. The process 500 starts and at step 502, multiple initiators each send a request transaction to a NoC and when the request transaction are marked for aggregation, then an RA (in communication with a switch or included in a switch) receives the request transactions marked for aggregation. At step 504, the RA, of the NoC, aggregates the request transactions to generate an aggregated request transaction. At step 506, the NoC forwards the aggregated request transaction to an intended target. The target receives the aggregates request transaction. At step 508, the target generates a response transaction that is sent to the NoC's RA. At step 510, the RA duplicates the response transaction and the NoC sends the duplicated response transaction to each initiator that sent a request transaction marked for aggregation. As noted herein and in accordance with various aspects and embodiments of the invention, there are some request transaction that are aggregated and completed without requiring or resulting in a response transaction.

The Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable medium comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A system comprising:
   a plurality of initiator intellectual property (IP) blocks for generating request transactions;
   at least one target IP block for generating responses to the request transactions; and
   a network-on-chip (NoC) in communication with the plurality of initiator IP blocks and the at least one target IP block, the NoC including:
     a plurality of initiator network interface units, each connected to one of the plurality of initiator IP blocks;
     at least one target network interface unit connected to the at least one target IP block;
     a plurality of switches connected to the plurality of initiator network interface units and the target network interface unit; and
     a plurality of request aggregators in communication with the plurality of switches,
   wherein at least one request aggregator of the plurality of request aggregators receives a plurality of request transactions from a first plurality of initiators IP blocks of the plurality of initiator IP blocks, each of the plurality of request transactions being marked for aggregation using at least a special identifier and each of the plurality of request transactions being intended for the at least one target IP block, and the at least one request aggregator then aggregates the plurality of request transactions into an aggregated request transaction that is sent to the at least one target IP block.

2. The system of claim 1, wherein the at least one target IP block generates a response transaction that is sent to a request aggregator of the plurality of request aggregators of the NoC.

3. The system of claim 2, wherein the request aggregator duplicates that response transaction and sends one duplicate response transaction to each of the first plurality of initiator IP block that sent the request transaction marked for aggregation.

4. A method comprising:
receiving, at request ingress ports of a request aggregator, aggregable request transactions from multiple initiator IP blocks, wherein the aggregable request transactions are each marked with a special identifier to indicate that the aggregable request transactions can be aggregated;
aggregating, at the request aggregator, the aggregable request transactions to generate an aggregated request transaction;
sending, from a request egress port of the request aggregator, the aggregated request transaction to a target IP block;
receiving, at a response ingress port of the request aggregator, a response transaction from the target IP block;
duplicating, at the request aggregator, the response transaction to generate multiple duplicated response transactions; and
sending, from a response egress port of the request aggregator, the multiple duplicated response transactions toward the multiple initiator IP blocks, such that each initiator IP block gets one duplicated response transaction.

5. The method of claim 4 further comprising sending a duplicated response transaction to a second request aggregator to further replicate the duplicated response transaction.

6. A non-transitory computer readable medium comprising code that is executed by a processor to cause a network-on-chip (NoC) to:
mark a plurality of request transactions, each received from a different initiator Intellectual Property (IP) block, with at least one special identifier to indicate that each of the plurality of request transactions are aggregable;
identify the plurality of request transactions that are marked for aggregation;
aggregate the request transactions to generate an aggregated request transaction;
send the aggregated request transaction to a target IP block;
receive a response transaction to the aggregated request transaction;
duplicate the response transaction resulting in a plurality of duplicated response transactions; and
send the plurality of duplicated response transactions toward multiple initiator IP blocks, such that each initiator IP block gets one duplicated response transaction.

7. The non-transitory computer readable medium of claim 6, wherein the special identifier is a special address associated with a request aggregator that is included in each of the plurality of request transactions.

8. The non-transitory computer readable medium of claim 6, wherein the special identifier is a qualifier bit that is included in each of the plurality of request transactions.

9. The non-transitory computer readable medium of claim 6, wherein the special identifier is a combination of bits that are included in each of the plurality of request transactions.

* * * * *